United States Patent [19]

Kitamura et al.

[11] Patent Number: 5,142,381
[45] Date of Patent: Aug. 25, 1992

[54] COMPLETE CLOSE-CONTACT TYPE IMAGE SENSOR

[75] Inventors: Koichi Kitamura; Hidenori Mimura; Kazuo Yamamoto; Yasumitsu Ohta; Kazuyoshi Sai; Tamio Saito, all of Kawasaki, Japan

[73] Assignee: Nippon Steel Corporation, Tokyo, Japan

[21] Appl. No.: 501,044

[22] Filed: Mar. 29, 1990

[30] Foreign Application Priority Data

Mar. 31, 1989 [JP] Japan .................................. 1-81259
Jul. 19, 1989 [JP] Japan .................................. 1-187048
Jul. 26, 1989 [JP] Japan .................................. 1-193358

[51] Int. Cl.⁵ .............................................. H04N 1/04
[52] U.S. Cl. ...................................... 358/482; 358/473; 358/483
[58] Field of Search ..................... 358/213.26, 473.27, 358/471, 482, 483; 250/208.1, 578

[56] References Cited

U.S. PATENT DOCUMENTS 4,866,291 9/1989 Shimada et al. ............... 250/208.10

Primary Examiner—Edward L. Coles, Sr.
Attorney, Agent, or Firm—Spencer, Frank & Schneider

[57] ABSTRACT

A complete close-contact type image sensor which comes into contact with an original and reads information from the original and which includes a sensor element for photoelectro conversion of a light signal reflected from the original and electronic parts such as a driven unit for driving the sensor element and taking out an electric signal stored in the sensor element, the image sensor being characterized in that the electronic parts such as the driving unit are disposed inside a plane including the surface of contact with the original. According to the above construction of the present invention, since the electronic parts, including the driving unit, are disposed inside the plane which includes the surface of contact with the original, the path of transfer of the original can be made rectilinear to stabilize the feed of the original without enlarging the gap between the sensor element and the original.

13 Claims, 3 Drawing Sheets

COMPLETE CLOSE-CONTACT TYPE IMAGE SENSOR

BACKGROUND OF THE INVENTION

1. Field of the Invention

The present invention relates to a complete close-contact type image sensor for use in a small-sized facsimile or the like which reads an original without reduction in size.

2. Description of the Prior Art

Close-contact type image sensors can read originals without using an optical reduction system, so the optical path length is short and the device size can be reduced. Recently, therefore, they have been widely used as readers in small-sized facsimiles and bar code readers.

Among the conventional close-contact type image sensors there are those which employ an optical actual size system typified by selfoc lens in place of an optical reduction system to form an image on sensor elements.

Also, there has been developed a close-contact type image sensor of the type in which selfoc lens is not used in order to reduce the cost of the image sensor, and sensor elements are brought into close contact with an original to read an image. The close-contact type image sensor of this type will hereinafter be referred to as a complete close-contact type image sensor or merely as a sensor.

FIG. 6 is a schematic sectional view showing the structure of a conventional complete close-contact type image sensor. This sensor includes a glass substrate 86 on which there are formed a sensor element 2 coated with a protective film 82 and a contact portion 84 for the input and output of the sensor element 2; a printed circuit board 88 on which is placed the glass substrate 86 and which is provided with a driving IC 4 for taking out an electric signal stored in the sensor element 2; a thermo-pressure bonding electroconductive seal 90 which connects the contact portion 84 and the driving IC 4 with each other; a holder 92 which holds the printed circuit board 88, etc. therein; and a light source 94. The printed circuit board 88 is formed with a slit 96 for the transmission of light emitted from the light source 94. The numeral 6 denotes a roller which pushes an original 10 against the sensor element 2. The sensor element 2 is provided in a large number in the direction perpendicular to the paper surface according to the width of the original 10 to be read. The sensor having the construction just described above is disclosed in Japanese Patent Application No. Hei 02-305064.

The light emitted from the light source 94 passes through the slit 96 and is reflected by the original 10 and applied to the sensor element 2, whereby it is photoelectro-converted into an electric signal. The driving IC 4 drives the sensor element 2 through the contact portion 84 for input and output and also through the thermo-pressure bonding electroconductive seal 90, and reads information stored in the sensor element 2.

In the conventional sensor, at the time of reading information from the original 10, it is impossible to feed the original 10 in a stable manner because the path of transfer of the original 10 includes such bent portions 85 as shown in FIG. 6, thus often resulting in the occurrence of jam or deterioration of the image quality. In this case, the path of transfer of the original 10 can be made rectilinear by thickening the protective film 82. However, if the protective film 82 is made thick, there arises the problem that the gap between the original 10 and the sensor element 2 becomes larger and so the MTF (Modulation Transfer Function) is deteriorated.

In the complete close-contact type image sensor, moreover, since the sensor is pushed against the original by the roller 6 or the like, there arises the problem of abrasion of the sensor. In the conventional complete close-contact type image sensor, however, there is the drawback that the abrasion proceeds rapidly because it is only the protective film 82, such as a polyimide film as shown in FIG. 6, that is provided for the protection of the sensor element 2.

Further, in the conventional complete close-contact type image sensor, since the sensor is pushed against the original 10, there is generated static electricity by the sliding contact of the sensor with the original 10, which sometimes causes breakage of the sensor element 2.

The present invention has been accomplished in view of the above circumstances and it is an object thereof to provide a complete close-contact type image sensor capable of feeding an original stably without deterioration of MTF.

It is another object of the present invention to provide a complete close-contact type image sensor capable of improving the abrasion resistance.

It is a further object of the present invention to provide a complete close-contact type image sensor capable of preventing the breakage of sensor elements caused by static electricity.

SUMMARY OF THE INVENTION

According to the present invention, in order to achieve the above-mentioned objects there is provided a complete close-contact type image sensor which comes into contact with an original and reads information from the original and which includes a sensor element for photoelectric conversion of a light signal reflected from the original and electronic components such as a driving unit for driving the sensor element and taking out an electric signal stored in the sensor element, the image sensor being characterized in that the electronic components such as the driving unit are disposed inside a plane including the surface of contact with the original.

In the above construction, since the electronic components such as the driving unit are disposed inside the plane which includes the surface of contact with the original, the original transfer path is made rectilinear without enlarging the gap between the sensor element and the original, whereby the original can be fed stably and it is possible to prevent the deterioration of the image quality caused by jam or unevenness in the transfer speed.

DESCRIPTION OF THE PREFERRED EMBODIMENTS

Preferred embodiments of the present invention will be described in detail hereinunder with reference to the accompanying drawings.

Figure 1:
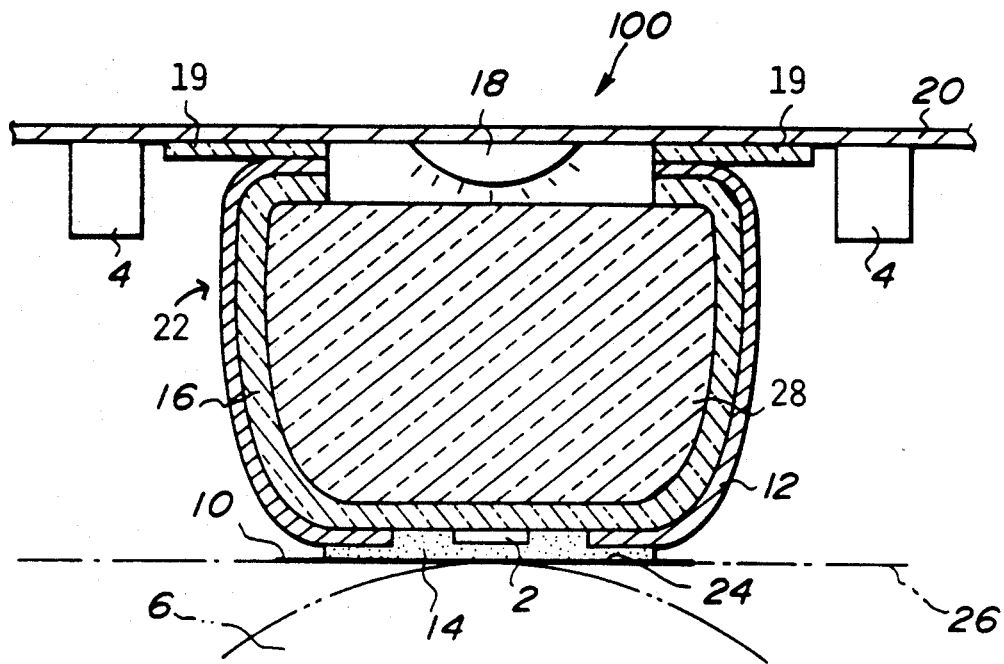
FIG. 1 is a schematic sectional view showing the construction of a complete close-contact type image sensor according to a first embodiment of the present invention.
Figure 6:
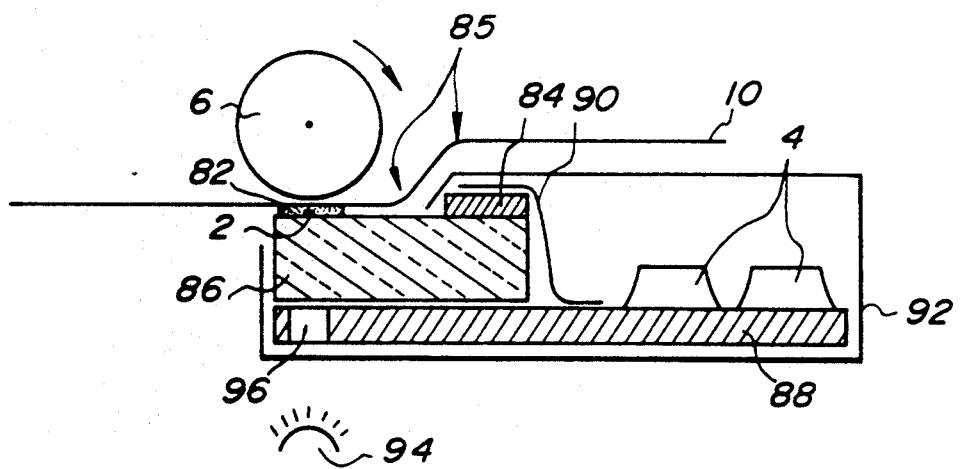
FIG. 6 is a schematic sectional view showing the construction of a conventional complete close-contact type image sensor.

In FIG. 1, which is a schematic sectional view showing the construction of a complete close-contact type image sensor according to the first embodiment of the present invention, the sensor, indicated at 100, includes a light transmitting film substrate 16 on which there are formed a sensor element 2, a wiring pattern 12 and a protective film 14; a transparent resin 28 which serves as a core; and a printed circuit board 20 on which there are formed a driving IC 4 and a wiring pattern 16 for the driving IC and a light source 18 is also provided. The portions having the same functions as in the conventional complete close-contact type image sensor shown in FIG. 6 are indicated by the same reference numerals and detailed explanations thereof omitted.

In the complete close-contact type image sensor 100 of this embodiment, the sensor element 2 and the wiring pattern 12 are formed on the light transmitting film substrate 16 which is a transparent polymeric film such as a polyester film or a polyimide film. The light transmitting film substrate 16 is bent along the transparent resin 28 and the section thereof is generally U-shaped. One end of the wiring pattern 12 is connected to the sensor element 2, while the other end thereof is in abutment with one end of the wiring pattern 19 formed on the printed circuit board 20. The other end of the wiring pattern 19 is connected to the driving IC 4 provided on the printed circuit board 20. The portion of the sensor 100 which comes into contact with the original 10 is coated with the protective film 14, e.g. polyimide film, to prevent the sensor element 2 from being damaged by contact with the original 10. The thickness of the light transmitting film substrate 16 is in the range of 10 to 100 $\mu$m when the size of the sensor element 2 is $100 \times 100$ $\mu m^2$.

Light emitted from the light source 18 is reflected by the original 10 and applied to the sensor element 2, then is photoelectro-converted into an electric signal by the sensor element 2. The driving IC 4 drives the sensor element 2 through the wiring patterns 12 and 19 and reads information stored in a multitude of sensor elements 2 which are arranged in the direction perpendicular to the paper surface.

In this embodiment, the sensor element 2 and the wiring pattern 12 are formed on the light transmitting film 16, and the sensor element 2 and the driving IC 4 can be connected together through the wiring pattern 12 on the light transmitting film substrate 16, so by bending the substrate 16, a connection 22 which connects the sensor element 2 and the driving IC 4 with each other can be disposed inside (on the upper side in FIG. 1) with respect to a plane 26 which includes the surface of contact with the original 10.

In the embodiment illustrated in FIG. 1, therefore, the connection between the sensor element 2 the driving IC 4 is made on the printed circuit board 20 which is disposed behind the sensor element 2, through the wiring patterns 12 and 19, and the connection 22 between the sensor element 2 and the driving IC 4 is disposed on the printed circuit board 20. Thus, the surface of contact 24 with the original 10 is formed most projectingly, and the electronic components, including the wiring pattern 12, are disposed inside the plane 26 which includes the contact surface 24, so the transfer path of the original 10 can be made rectilinear without enlarging the gap between the surface of the sensor element 2 and the original 10, that is, without deterioration of MTF. As a result, the transfer of the original can be done stably and it is possible to prevent deterioration of the image quality caused by a jam or an unevenness in the transfer speed.

According to this embodiment, the sensor element 2, as well as the wiring pattern 12, are formed on the light transmitting film substrate 16 which is flexible, and the connection with the driving IC 4 can be effected using the wiring pattern 12, so in comparison with the conventional sensor the mass production can be performed easily and the number of components used is decreased, thus leading to a reduction of cost.

In this embodiment, moreover, since the sensor element 2 is formed on the flexible, light transmitting film substrate 16 and a glass substrate is not used, the shape of the sensor 100 is not limited to a rectilinear shape; it may be a curved shape.

Figure 2:
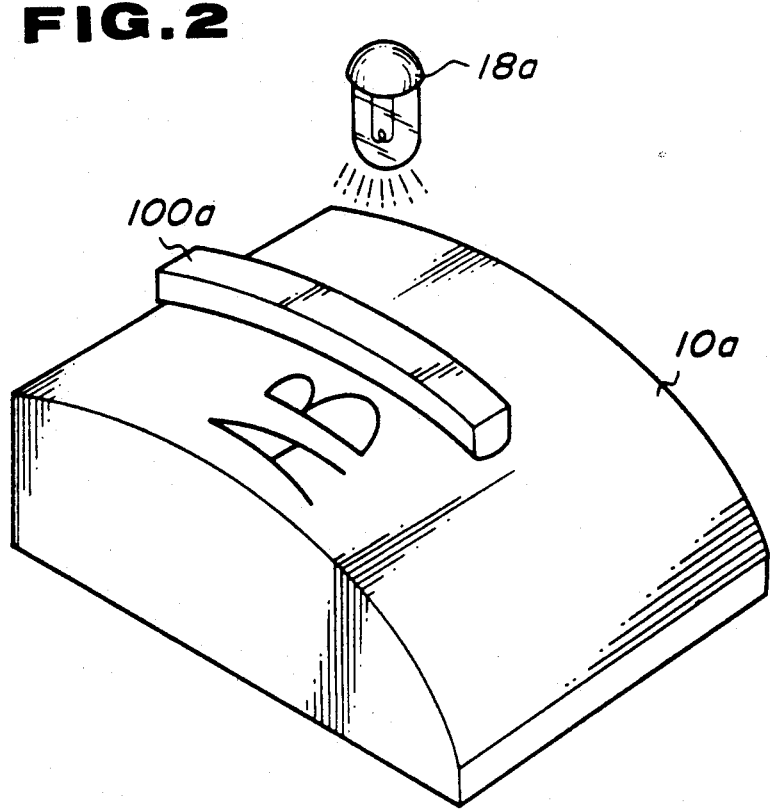
FIG. 2 is a schematic perspective view showing an application example thereof.

FIG. 2 is a schematic diagram showing how to read an original 10a, e.g. a thick dictionary, using a sensor 100a, with a light source 18a being disposed exteriorly. Where the original 10a is a thick dictionary, its surface is curved as shown in the same figure. Even in this case, according to this embodiment the sensor 100a can be brought into close contact with the curved original 10a, so the original can be read without distortion of image. If the light source 18a is flexible, it may be disposed within the sensor 100a.

Figure 3A:
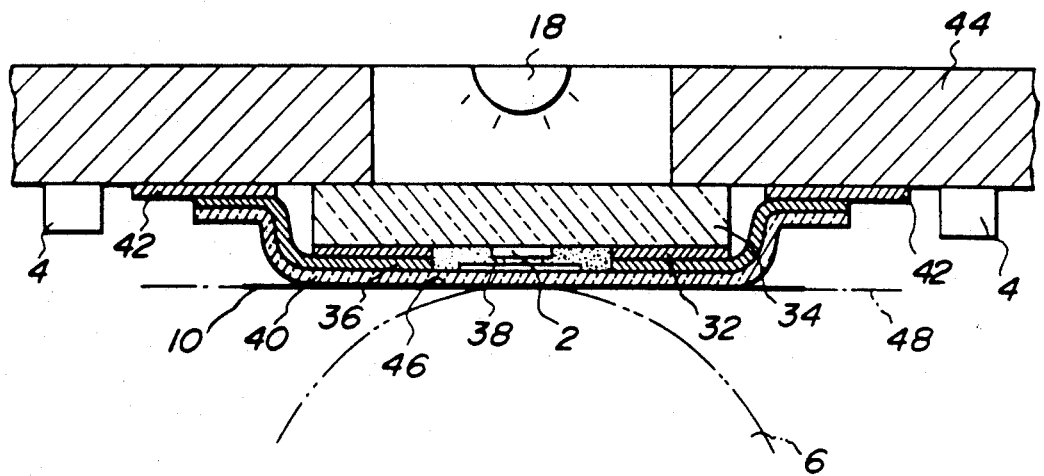
FIG. 3(a) is a schematic sectional view showing the construction of a complete close-contact type image sensor according to a second embodiment of the present invention.
Figure 3B:
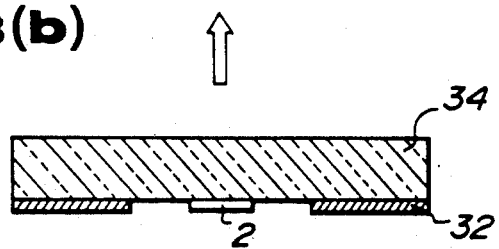
FIG. 3(b) is a schematic sectional view showing the construction of a glass substrate used therein.
Figure 3C:
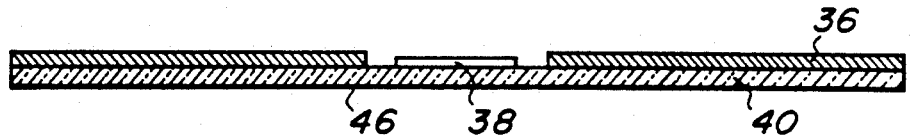
FIG. 3(c) is a schematic sectional view showing the construction of a light transmitting film used therein.

The second embodiment of the present invention will now be described with reference to FIGS. 3(a)-3(c). FIG. 3(a) is a schematic sectional view of a complete close-contact type image sensor according to the second embodiment; FIG. 3(b) is a schematic sectional view of a glass substrate used therein; and FIG. 3(c) is a schematic sectional view of a light transmitting film used therein. The sensor of this embodiment includes a glass substrate (a light transmitting substrate) on which are formed a sensor element 2 and a contact portion 32 for the sensor element; a light transmitting film 40 on which are formed a wiring pattern 36 and a transparent metallic film 38; and a printed circuit board 44 provided with a driving IC 4, the glass substrate 34 and a light source 19 and formed with a wiring pattern 42 for the driving IC 4. The portions having the same function as in the complete close-contact type image sensor of the embodiment shown in FIG. 1 are indicated by the same reference numerals and detailed explanations thereof omitted.

The light transmitting film 40 is, for example, such a transparent polymeric film as a polyester film or a polyimide film. It is stuck on and covers the face of the glass substrate 34 with the sensor element 2 formed thereon.

On the back of the light transmitting film 40 there is formed the wiring pattern 36. One end of the wiring pattern 36 is in abutment with the contact portion 32 of each sensor element 2 formed on the glass substrate 34, while the other end thereof is in abutment with one end of the wiring pattern 42 formed on the printed circuit board 44. The other end of the wiring pattern 42 is connected to the driving IC 4 which serves as a driving unit. Further, on the back of the light transmitting film 40 there is centrally formed the transparent metallic film 38 (a light transmitting electroconductive film) which is connected to the ground (not shown) so as not to come into contact with the wiring pattern 36. For example, the transparent metallic film 38 is an ITO (Indium Tin Oxide) film. The thickness of the light transmitting film 40 is in the range of b 10 to 100 $\mu$m when the size of the sensor element 2 is $100 \times 100$ $\mu m^2$. The gap between the transparent metallic film 38 and the sensor element 2 is insulated.

The light emitted from the light source 18 is reflected by the original 10 and applied to the sensor element 2, then is photoelectro-converted into an electric signal by the sensor element 2. The driving IC 4 drives the sensor element 2 through the wiring pattern 36 and reads information stored in each sensor element 2, the sensor element 2 being arranged in a large number in the direction perpendicular to the paper surface.

Since in this embodiment the sensor element 2 and the driving IC 4 are connected together through the wiring pattern 36 formed on the back of the light transmitting film 40, the transfer path of the original 10 can be made rectilinear without enlarging the gap between the sensor element 2 and the original 10.

Further, since the light transmitting film 40 is stuck on the surface of the glass substrate 34 on which the sensor element 2 is formed, a high frictional resistance is attained against the original 10 and the mechanical strength is improved as compared with the conventional sensor. Besides, since the surface of contact 46 with the original is the surface of the light transmitting film 40, it is possible to push the original strongly against the contact surface 46. Additionally, since the contact surface 46 is flat, the contact surface 46 and the original 10 can be brought into closer contact with each other than in the conventional sensor.

When the present inventors conducted an experiment using a 50 $\mu$m thick light transmitting film 40 in the state of complete close contact, it was possible to read a hundred thousand of size A4 originals. Thus, according to this embodiment it is possible to improve the abrasion resistance of the sensor as compared with the prior art.

Moreover, since the transparent metallic film 38 connected to the ground is formed on the light transmitting film 40, static electricity generated by the friction of the contact surface 46 with the original 10 can be surely eliminated by the connection thereof to the ground through the transparent metallic film 38. Consequently, it is possible to prevent the sensor element 2 from being damaged by the static electricity.

According to this second embodiment, the existing flexible connector technique can be used as it is, and the cost is low because the number of components used is smaller than that in the conventional sensor.

Further, like the first embodiment, the electronic parts, including the driving IC 4, are disposed inside (on the upper side in FIG. 3) with respect to a plane 48 including the surface of contact 46 with the original 10. The resulting function and effect are the same as in the first embodiment. Although in this embodiment the driving IC 4 is disposed on the lower side of the printed circuit board 44, it may be disposed on the upper side of the same board.

Figure 4:
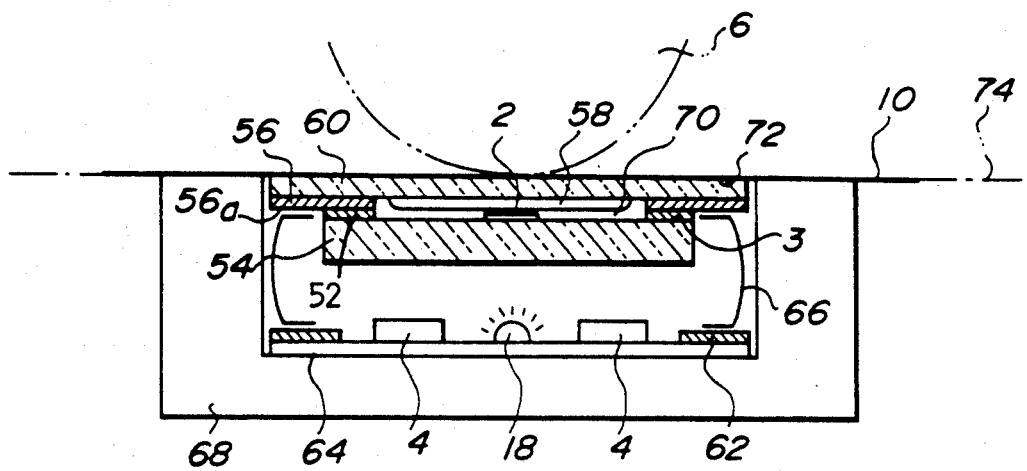
FIG. 4 is a schematic sectional view showing the construction of a complete close-contact type image sensor according to a third embodiment of the present invention.
Figure 5B:
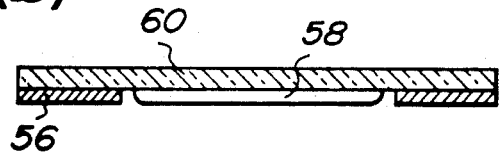
FIG. 5(b) is a schematic sectional view showing the construction of an upper glass plate used therein.
Figure 5A:
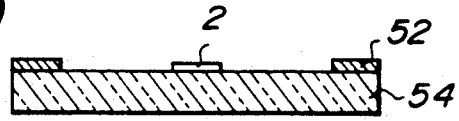
FIG. 5(a) is a schematic sectional view showing the construction of a glass substrate used therein.

The third embodiment of the present invention will now be described with reference to FIGS. 4, 5(a) and 5(b). FIG. 4 is a schematic sectional view showing the construction of a close-contact type image sensor according to the third embodiment; FIG. 5(a) is a schematic sectional view showing the construction of a glass substrate used therein; and FIG. 5(b) is a schematic sectional view showing the construction of an upper glass plate used therein. The sensor of this third embodiment includes a glass substrate 54 on which are formed a sensor element 2 and a contact portion 52; an upper glass plate 60 on which are formed a relaying contact portion 56 and a transparent metallic film 58; a printed circuit board 64 provided with a driving IC 4 and a light source 18 and formed with a wiring pattern 62 for the driving IC 4; a thermo-pressure bonding electroconductive seal 66 for connecting the relaying contact portion 56 and the wiring pattern 62 with each other; and a holder 68 which holds therein the glass substrate 54, the upper glass plate 60 and the printed circuit board 64. The portions having the same functions as in the close-contact type image sensor of the first embodiment shown in FIG. 1 are indicated by the same reference numerals and explanations thereof omitted. The upper glass plate 60 is formed using a light transmitting material, e.g. thin glass. It is formed a little larger than the glass substrate 54 with the sensor element 2 formed thereon. On each end of the back of the upper glass plate 60 there is formed the relaying contact portion 56. The relaying contact portion 56 is partially in abutment with the contact portion 52 formed on the upper surface of the glass substrate 54, and one end of the thermo-pressure bonding electroconductive seal 66 is bonded by the application of heat and pressure to an end portion 56a of the relaying contact 56. The other end of the seal 66 is connected to the wiring pattern 62 for the driving IC 4. On the back of the upper glass plate 60 there is formed the transparent metallic film 58 which is connected to the ground (not shown) so as not to come into contact with the relaying contact portion 56. The transparent metallic film 58 is an ITO (Indium Tin Oxide) film for example. The thickness of the upper glass plate 60 is in the range of 10 to 100 $\mu$m when the size of the sensor element 2 is $100 \times 100$ $\mu m^2$. The thermo-pressure bonding electroconductive seal 64 may be wire or the like.

The light emitted from the light source 18 is reflected by the original 10 and applied to the sensor element 2, then is photoelectro-converted into an electric signal by the sensor element 2. The driving IC 4 drives the sensor element 2 through the wiring pattern 62, thermo-pressure bonding electroconductive seal 66, relaying contact portion 56 and contact portion 52, and reads information stored in the sensor element 2.

In this embodiment, the back of the upper glass plate 60 is bonded to the upper surface of the glass substrate 54 using an adhesive sealing material 70 so that the contact portion 52 and the relaying contact portion 56 come into abutment with each other and the end portion 56a of the relaying contact portion 56 projects from the edge of the glass substrate 54. One end portion of the thermo-pressure bonding electroconductive seal 66 is bonded to the end portion 56a of the relaying contact 56 by the application of heat and pressure, while the other end portion thereof is bonded to the wiring pattern 62, whereby wiring between the sensor element 2 and the sensor element driving IC 4 can be effected. Thus, on the surface of the glass substrate 54 on which the sensor element 2 is formed there is no such connecting member as the thermopressure bonding electroconductive seal 66, and therefore the transfer path of the original 10 can be made rectilinear without enlarging the gap between the surface of the sensor element 2 and the original 10.

According to this embodiment, since the upper glass plate 60 is provided above the sensor element 2, it is possible to strengthen the mechanical protection for the sensor element 2. When the present inventors conducted an experiment using a 50 μm thick upper glass plate 60 in the state of complete close contact, it was possible to read a hundred thousand of size A4 originals. Thus, according to this embodiment it is possible to improve the abrasion resistance of the sensor as compared with the prior art.

Moreover, since the upper surface of the sensor is a glass plate, it is possible to push the original against the upper surface of the sensor more strongly than in the prior art. Besides, since the upper surface of the sensor is flat, it is possible to bring the sensor and the original into contact with each other more closely than in the prior art.

Further, since the transparent metallic film 58 connected to the ground is formed on the upper glass plate 60, static electricity generated by the friction of the upper glass 60 with the original 10 can be surely eliminated by the connection thereof to the ground through the transparent metallic film 58. Consequently, it is possible to prevent the sensor element 2 from being damaged by the static electricity.

Additionally, like the first embodiment, the electronic parts, including the driving IC 4, are disposed inside (on the lower side in FIG. 4) with respect to a plane 74 including the surface of contact 72 with the original 10. The resulting function and effect are the same as in the first embodiment.

The embodiments of the present invention have been described above, but it is as acknowledged by those skilled in the art that various other modifications may be made within the scope of the present invention. Therefore, the scope of protection should be defined by claims and words equivalent thereto.

What is claimed is:

1. In a complete close-contact type image sensor which comes into contact with an original and reads information from the original and which includes a sensor element for photoelectric conversion of a light signal reflected from the original, and electronic parts including a driving unit for driving said sensor element and taking out an electrical signal stored in the sensor element, the improvement wherein said electronic parts, including said driving unit, are disposed on only one side of a plane in which the sensor contacts the original, with the original disposed on the other side of said plane.

2. An image sensor according to claim 1, wherein said electronic parts further include:
 a light transmitting substrate, said sensor element being formed on said substrate; and
 means electrically connecting said sensor element to said driving unit, said driving unit driving said sensor element, and taking out said electrical signal, through said means.

3. An image sensor according to claim 1, wherein said electronic parts further include:
 a wiring pattern connecting said sensor element and said driving unit with each other; and
 a light transmitting film substrate, said sensor element and said wiring pattern being formed on said substrate.

4. An image sensor according to claim 1, wherein said electronic parts further include:
 a light transmitting substrate, said sensor element being formed on a face of said substrate;
 a light transmitting film fixed to and covering said face; and
 a wire pattern formed on said light transmitting film, said sensor element and said driving unit being electrically connected to each other through said wire pattern.

5. An image sensor according to claim 4, wherein said electronic parts further include a grounded light transmitting electroconductive film formed on a face of said light transmitting film opposed to said substrate.

6. An image sensor according to claim 1, wherein said electronic parts further include:
 a light transmitting substrate, said sensor element being formed on a face of said substrate;
 a light transmitting plate, at least one end of said plate projecting from an edge of said substrate, said plate being disposed in close proximity to said substrate so that a back of said plate opposes said face of said substrate;
 a contact portion for said sensor element, formed on said substrate; and
 relaying contact portion formed on said back of said plate so as to partially abut said contact portion for the sensor element and so as to project at an end of said relaying contact portion from said edge of said substrate, said sensor element being connected to said driving unit through said end of said relaying contact portion.

7. An image sensory according to claim 6, wherein said electronic parts further include a grounded light transmitting electroconductive film formed on a face of said plate so as not to come in contact with said relaying contact portion.

8. In a complete close-contact type image sensor including a sensor element for photoelectric conversion of a light signal reflected from an original and a driving unit for driving said sensor element and taking out an electrical signal stored in the sensor element, the improvement wherein a wiring pattern, connecting said sensor element and said driving unit with each other, and said sensor element are formed on a light transmitting film substrate.

9. In a complete close-contact type image sensor, including a light transmitting substrate on a face of which is formed a sensor element for photoelectric conversion of a light signal reflected from an original, and a driving unit for driving said sensor element and taking out an electrical signal stored in the sensor element, the improvement wherein a light transmitting film with a wiring pattern formed thereon is stuck on and covers the face of said light transmitting substrate on which said sensor element is formed, and said sensor element and said driving unit are connected together through said wiring pattern.

10. A complete close-contact type image sensor according to claim 9, wherein a light transmitting electroconductive film connected to ground is formed on a face of said light transmitting film opposed to said light transmitting substrate.

11. In a complete close-contact type image sensor including a light transmitting substrate on which are formed a sensor element for photoelectric conversion of a light signal reflected from an original and a contact portion for said sensor element, and a driving unit for driving said sensor element and taking out an electrical signal stored in the sensor element, the improvement wherein a light transmitting plate, at least one end of which projects from an edge of said substrate, is disposed in close proximity to the substrate so that a back of said plate is opposed to a face of the substrate; a relaying contact portion is formed on the back of said plate so as to partially abut said contact portion for the sensor element and project at an end thereof from said edge of said substrate; and said sensor element is connected to said driving unit through said end of the relaying contact portion.

12. A complete close-contact type image sensor according to claim 11, wherein a light transmitting electroconductive film connected to the ground is formed on a face of said light transmitting plate opposed to said light transmitting substrate so as not to come into contact with said relaying contact portion.

13. A close-contact image sensor which comes into contact with an original disposed on one side of a plane and reads information from said original, comprising:
a light transmitting layer having a contact surface in which contacts the original, said surface lying in said plane;
a light transmitting substrate;
a sensor element, disposed between said layer and said substrate for photoelectric conversion of a light signal reflected from the original, said sensor element being formed on said substrate;
a driving unit for driving said sensor element and taking out an electrical signal stored in said sensor element; and
means electrically connecting said sensor element to said driving unit; said driving unit driving said sensor element, and taking out the electrical signal stored in said sensor element, through said means; said layer, said substrate, said sensor element, said driving unit and said means being disposed on only the side of said plane opposite said one side.

* * * * *